A. P. PRATHER.
WHEEL CONSTRUCTION.
APPLICATION FILED APR. 10, 1914.

1,116,916.

Patented Nov. 10, 1914.

2 SHEETS—SHEET 1.

WITNESSES

Asa P. Prather
INVENTOR

Attorneys

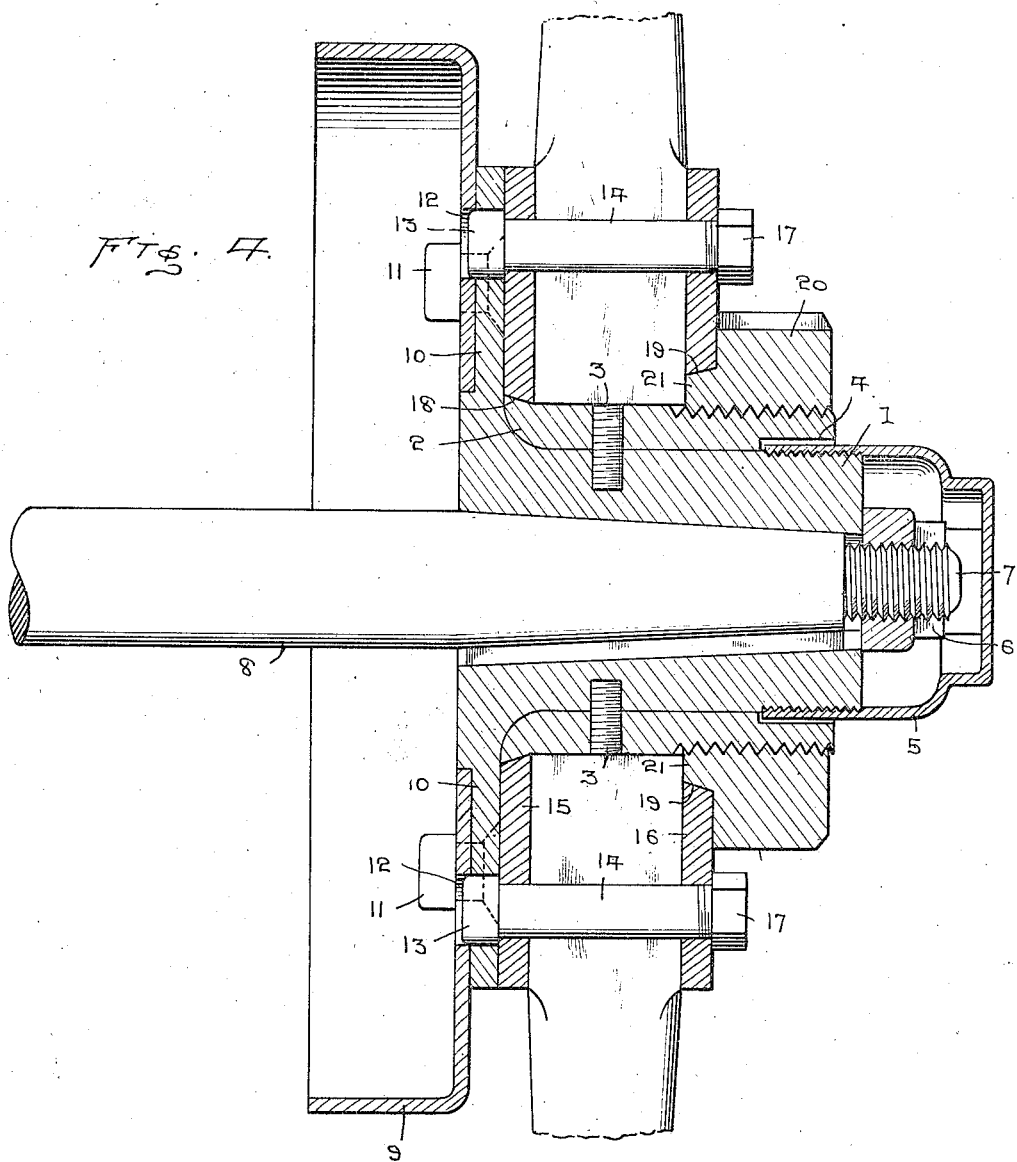

UNITED STATES PATENT OFFICE.

ASA P. PRATHER, OF GEORGETOWN, KENTUCKY.

WHEEL CONSTRUCTION.

1,116,916.

Specification of Letters Patent.   Patented Nov. 10, 1914.

Application filed April 10, 1914.   Serial No. 830,895.

*To all whom it may concern:*

Be it known that I, ASA P. PRATHER, a citizen of the United States, residing at Georgetown, in the county of Scott and State of Kentucky, have invented certain new and useful Improvements in Wheel Construction; and I do hereby declare the following to be a full, clear, and exact description of the invention, such as will enable others skilled in the art to which it appertains to make and use the same.

My invention relates to wheel construction and particularly to that form of wheel, the parts of which may be very quickly disassembled or separated from the other parts and my prime object among others is to provide a strong, durable and thoroughly reliable form of wheel of which the assembled spokes and rim, together with the tire thereon may be quickly removed from the hub and its contiguous parts and readily replaced.

A further object of my invention is to provide simple, reliable and efficient means whereby the assembled spokes may be instantly separated from all connection with the hub members and as quickly reassembled and securely locked in their operative position relative to the hub.

Figure 1:
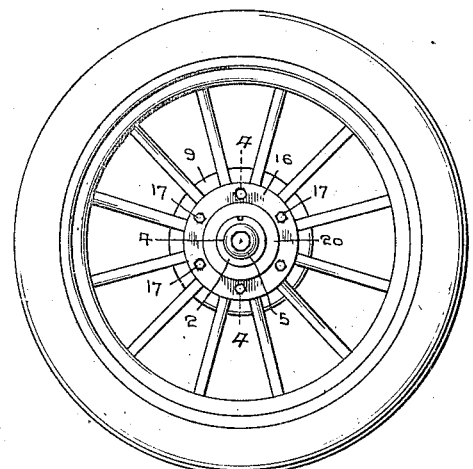
Figure 2:
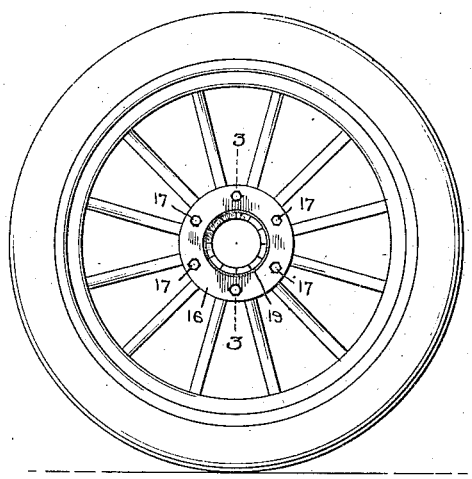
Figure 3:
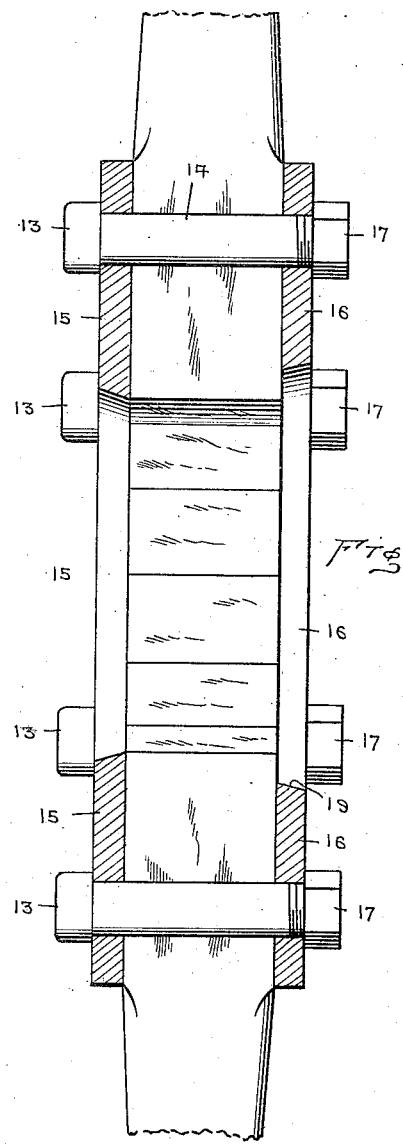

Other objects and advantages will be hereinafter made clearly apparent in the following specification which considered in connection with the accompanying drawings in which, Figure 1 is a side elevation of my complete wheel. Fig. 2 is a similar view of the separable portion of my wheel, ready to be immediately disposed and secured upon the hub. Fig. 3 is an enlarged sectional view of Fig. 2 on dotted line 3—3. Fig. 4 is a central, sectional view of my complete wheel.

For convenience of description, various details of my invention and coöperating accessories will be designated by numerals, the same numeral applying to a corresponding part throughout the several views.

In materializing my invention, I have in the present instance, applied the same to the ordinary hub of what is termed the Ford machine, and I employ the hub 1, which is the ordinary hub now in use and upon the same I properly shring or otherwise fixedly secure the sleeve 2, the inner end of said sleeve being internally reamed out so that it will snugly fit the contour of the inner end of the head which will be obviously desirable. If desired the said sleeve 2 may be additionally secured after being shrunk upon the hub as by the threaded bolt sections 3 fitting suitably threaded apertures in the sleeve and hub, and it follows that when thus mounted in position upon the hub, the said sleeve will be disposed permanently in its operative position.

I prefer to provide an annular recess 4 in the outer end of the sleeve 3, said annular recess being designed to receive the inner edge of the cap 5 usually employed in housing the nut 6 and the end 7 of the axle 8. It will be seen that I have also shown the housing 9 which is the ordinary housing employed for the brake and said housing is secured in the usual manner to the hub 1 by being bolted to the flange 10 formed upon said hub, as by the usual form of bolts 11. I also utilize the flange 10 in providing a reliable seating for the removable part of my wheel inasmuch as I form in said flange and in a contiguous part of the housing 9, a plurality of apertures 12 designed to receive the heads 13 of the locking bolts 14 employed in holding the assembled spokes together, and in order that the assembled spokes may be securely united in permanent relationship to each other, I provide the retaining bands or flattened ring members 15 and 16 which are provided with registering apertures to receive the bolts 14 which latter are reliably secured in their assembled positions by suitable locking nuts 17. I desire also to call attention to the fact that I have formed the inner end of the sleeve 2 upon its outer side with the wedge-like or beveled face 18 and I have also formed the contiguous edge of the flattened ring or band 15 with a corresponding bevel to fit said beveled face 18 and it follows that when the said band 15 is forced against the flange 10, as will be hereinafter explained, a wedge action is set up between said parts. The outer band or flattened ring member 16 I also form on its inner edge with a similarly beveled face 19, the opening in said band being preferably of a greater diameter than the opening in the inner band 15. It will also be observed that I have provided suitable threads upon the outer end of the sleeve 2 to receive the locking nut 20, which latter is provided upon its inner side with an inwardly directed flange 21, the outer side of which is provided with a beveled face to fit the beveled face 19 of the flattened ring member 16 and it is therefore obvious that when the nut 20 is securely turned home upon the threaded end of the sleeve 2, the flange or wedge-like extension 19 will be forced into engagement with the contiguous beveled edge of the band 16 thereby insuring that the assembled spokes will be very securely locked and held in their operative position. It also follows that the assembled spokes together with the bands or flattened ring members 15 and 16 may be very quickly removed from the hub by simply removing the locking nut 20 as with a spanner or other preferred form of wrench, and without in any way disturbing any of the other parts of the hub. It is therefore obvious that my improved wheel construction makes it possible to remove in the briefest possible time the assembled spokes and their accompanying rim and tire if any of said parts become damaged. It therefore follows that by holding in reserve a set of assembled spokes together with their rim and inflated tire, a damaged tire may be very quickly removed and instantly replaced by the reserve portion of the wheel and my invention, therefore, will be found very valuable in meeting the instant needs arising out of accidents or the like. My invention will, therefore, be particularly useful for all users of automobiles, who do not wish to personally perform the work of repairing their tires or where the question of time enters as an important element as in race courses.

Believing that the construction, advantages and manner of using my invention have thus been made clearly apparent, further description is deemed unnecessary.

While I have described the preferred construction and combination of parts deemed necessary in materializing my invention, yet I wish to comprehend in this application all possible substitutes and equivalents which may be considered as falling fairly in the scope of my invention as reasonable modifications and changes can be made in the construction of various elements composing my invention.

What I claim as new and desire to secure by Letters-Patent is:

The herein described wheel construction comprising a hub member proper, a sleeve permanently secured to said hub member and having the outer end thereof properly threaded, a plurality of spokes having rim and tire thereon properly assembled together and secured in permanent relationship by a pair of band members one upon either side of the inner ends of said spokes; interfitting devices upon the inner end of said sleeve and said inner band in combination with a locking nut threaded upon the sleeve and having upon its inner side a flange extension provided with a wedging face to engage and lock the contiguous band, a plurality of locking bolts for holding said bands and the interposed spokes together, the inner ends of said bolts being seated in apertures provided in a contiguous part of the flange of the hub.

In testimony whereof I have signed my name to this specification in the presence of two subscribing witnesses.

ASA P. PRATHER.

Witnesses:
C. A. NEALE.
W. T. FITZ GERALD.